(12) United States Patent
Bychkov et al.

(10) Patent No.: US 10,031,578 B2
(45) Date of Patent: Jul. 24, 2018

(54) GAZE DETECTION IN A 3D MAPPING ENVIRONMENT

(71) Applicant: Apple Inc., Cupertino, CA (US)

(72) Inventors: Eyal Bychkov, Hod Hasharon (IL); Oren Brezner, Rishon Lezion (IL); Micha Galor, Tel Aviv (IL); Ofir Or, Ramat Gan (IL); Jonathan Pokrass, Bat Yam (IL); Amir Hoffnung, Tel Aviv (IL); Tamir Berliner, Beit Hashmonay (IL)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 15/256,654

(22) Filed: Sep. 5, 2016

(65) Prior Publication Data

US 2016/0370860 A1    Dec. 22, 2016

Related U.S. Application Data

(63) Continuation of application No. 13/960,822, filed on Aug. 7, 2013, now Pat. No. 9,454,225, which is a
(Continued)

(51) Int. Cl.
    *G06F 3/01*    (2006.01)
(52) U.S. Cl.
    CPC ............. *G06F 3/013* (2013.01); *G06F 3/017* (2013.01); *G06F 2203/0381* (2013.01)
(58) Field of Classification Search
    CPC ... G06F 3/013; G06F 3/017; G06F 2203/0381
    See application file for complete search history.

(56) References Cited

U.S. PATENT DOCUMENTS

2004/0193413 A1   9/2004  Wilson et al.
2006/0239670 A1*  10/2006  Cleveland ............ A61B 3/113
                                                        396/51
(Continued)

FOREIGN PATENT DOCUMENTS

WO     0051097 A2    8/2000
WO     0159975 A2    8/2001
WO  2007079425 A2    7/2007

OTHER PUBLICATIONS

HoloDesk: Direct 3D Interactions with a Situated See-Through Display—Microsoft Research, 250 pages, Oct. 19, 2011 (https://www.youtube.com/watch?v=JHL5tJ9ja_w).
(Continued)

*Primary Examiner* — Abhishek Sarma
(74) *Attorney, Agent, or Firm* — D. Kligler IP Services Ltd.

(57) ABSTRACT

A method includes receiving a sequence of three-dimensional (3D) maps of at least a part of a body of a user of a computerized system and extracting, from the 3D map, 3D coordinates of a head of the user. Based on the 3D coordinates of the head, a direction of a gaze performed by the user and an interactive item presented in the direction of the gaze on a display coupled to the computerized system are identified. An indication is extracted from the 3D maps an indication that the user is moving a limb of the body in a specific direction, and the identified interactive item is repositioned on the display responsively to the indication.

14 Claims, 10 Drawing Sheets

Related U.S. Application Data continuation of application No. PCT/IB2012/050577, filed on Feb. 9, 2012.

(60) Provisional application No. 61/440,877, filed on Feb. 9, 2011, provisional application No. 61/526,692, filed on Aug. 24, 2011, provisional application No. 61/538,867, filed on Sep. 25, 2011.

(56) References Cited

U.S. PATENT DOCUMENTS

| | | |
|---|---|---|
| 2007/0060336 A1 | 3/2007 | Marks et al. |
| 2010/0056274 A1 | 3/2010 | Uusitalo et al. |
| 2010/0324779 A1 | 12/2010 | Takahashi et al. |
| 2011/0006978 A1* | 1/2011 | Yuan .................. G06F 3/013 345/156 |
| 2011/0029918 A1* | 2/2011 | Yoo .................... G06F 3/017 715/800 |
| 2011/0267374 A1 | 11/2011 | Sakata et al. |

OTHER PUBLICATIONS

Du et al., "3D Hand Model Fitting for Virtual Keyboard System", IEEE Workshop on Applications of Computer Vision, 6 pages, year 2007.

U.S. Appl. No. 13/849,517 Office Action dated Feb. 28, 2017.

CN Application # 201380016670.6 Search Report dated Oct. 9, 2016.

Bergh et al., "Perceptive User Interface, a Generic Approach", Computer Vision in Human-Computer Interaction, ICCV 2005 Workshop on HCI(LNCS3766, Springer, 2005), pp. 60-69, Jan. 1, 2005.

Cheng et al., "Interaction Paradigms for Bare-Hand Interaction with Large Displays at a Distance", Human-Computer Interaction, pp. 195-222, Dec. 1, 2009.

European Application # 12745037.7 Search Report dated Aug. 10, 2017.

* cited by examiner

GAZE DETECTION IN A 3D MAPPING ENVIRONMENT

RELATED APPLICATIONS

This application is a continuation of U.S. patent application Ser. No. 13/960,822, filed Aug. 7, 2013, which is a continuation of PCT Patent Application PCT/IB2012/050577, filed Feb. 9, 2012, which claims the benefit of U.S. Provisional Patent Application 61/440,877, filed on Feb. 9, 2011, U.S. Provisional Patent Application 61/526,692, filed on Aug. 24, 2011, and U.S. Provisional Patent Application 61/538,867, filed on Sep. 25, 2011, which are incorporated herein by reference.

FIELD OF THE INVENTION

The present invention relates generally to human-machine interfaces, and specifically to interfaces that combine multiple user interaction modalities.

BACKGROUND

Many different types of user interface devices and methods are currently available. Common tactile interface devices include a computer keyboard, a mouse and a joystick. Touch screens detect the presence and location of a touch by a finger or other object within the display area. Infrared remote controls are widely used, and "wearable" hardware devices have been developed, as well, for purposes of remote control.

Computer interfaces based on three-dimensional (3D) sensing of parts of a user's body have also been proposed. For example, PCT International Publication WO 03/071410, whose disclosure is incorporated herein by reference, describes a gesture recognition system using depth-perceptive sensors. A 3D sensor, typically positioned in a room in proximity to the user, provides position information, which is used to identify gestures created by a body part of interest. The gestures are recognized based on the shape of the body part and its position and orientation over an interval. The gesture is classified for determining an input into a related electronic device.

Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

As another example, U.S. Pat. No. 7,348,963, whose disclosure is incorporated herein by reference, describes an interactive video display system, in which a display screen displays a visual image, and a camera captures 3D information regarding an object in an interactive area located in front of the display screen. A computer system directs the display screen to change the visual image in response to changes in the object.

Three-dimensional human interface systems may identify not only the user's hands, but also other parts of the body, including the head, torso and limbs. For example, U.S. Patent Application Publication 2010/0034457, whose disclosure is incorporated herein by reference, describes a method for modeling humanoid forms from depth maps. The depth map is segmented so as to find a contour of the body. The contour is processed in order to identify a torso and one or more limbs of the subject. An input is generated to control an application program running on a computer by analyzing a disposition of at least one of the identified limbs in the depth map.

Some user interface systems track the direction of the user's gaze. For example, U.S. Pat. No. 7,762,665, whose disclosure is incorporated herein by reference, describes a method of modulating operation of a device, comprising: providing an attentive user interface for obtaining information about an attentive state of a user; and modulating operation of a device on the basis of the obtained information, wherein the operation that is modulated is initiated by the device. Preferably, the information about the user's attentive state is eye contact of the user with the device that is sensed by the attentive user interface.

SUMMARY

There is provided, in accordance with an embodiment of the present invention a method including receiving a three-dimensional (3D) map of at least a part of a body of a user of a computerized system, receiving a two dimensional (2D) image of the user, the image including an eye of the user, extracting, from the 3D map and the 2D image, 3D coordinates of a head of the user, and identifying, based on the 3D coordinates of the head and the image of the eye, a direction of a gaze performed by the user.

There is also provided, in accordance with an embodiment of the present invention a method including receiving an image including an eye of a user of a computerized system, identifying, based the image of the eye, a direction of a gaze performed by the user, identifying, based on the direction of the gaze, a region on a display coupled to the computerized system, and performing an operation on content presented in the region.

There is additionally provided, in accordance with an embodiment of the present invention a method including presenting, by a computerized system, multiple interactive items on a display coupled to the computer, receiving, from a sensing device coupled to the computer, an input representing a gaze direction of a user, identifying a target point on the display based on the gaze direction, associating the target point with a first interactive item appearing on the display, and responsively to the target point, opening one or more second interactive items on the display.

There is further provided, in accordance with an embodiment of the present invention a method including receiving and segmenting a first sequence of three-dimensional (3D) maps over time of at least a part of a body of a user of a computerized system in order to extract 3D coordinates of a first point and a second point of the user, the 3D maps indicating a motion of the second point with respect to a display coupled to the computerized system, calculating a line segment that intersects the first point and the second point, identifying a target point where the line segment intersects the display, and engaging an interactive item presented on the display in proximity to the target point.

There is also provided, in accordance with an embodiment of the present invention an apparatus including a sensing device configured to receive a three dimensional (3D) map of at least a part of a body of a user and an image of an eye of the user, and to receive a two dimensional (2D) image of the user, the 2D image including an eye of the user, and a computer coupled to the sensing device and configured to extract, from the 3D map and the 2D image, 3D coordinates of a head of the user and to identify, based on the 3D coordinates of the head and the image of the eye, a direction of a gaze performed by the user.

There is additionally provided, in accordance with an embodiment of the present invention an apparatus including a sensing device configured to receive an image including an eye of a user, and a computer configured to identify, based the image of the eye, a direction of a gaze performed by the user, to identify, based on the direction of the gaze, a region on a display coupled to the computerized system, and to perform an operation on content presented in the region.

There is further provided, in accordance with an embodiment of the present invention an apparatus including a display, and a computer coupled to the display and configured to present multiple interactive items on the display, to receive, from a sensing device coupled to the computer, an input representing a gaze direction of a user, to identify a target point on the display based on the gaze direction, to associate the target point with a first interactive item appearing on the display, and responsively to the target point, to open one or more second interactive items on the display.

There is also provided, in accordance with an embodiment of the present invention an apparatus including a display, and a computer coupled to the display and configured to receive and segment a first sequence of three-dimensional (3D) maps over time of at least a part of a body of a user of a computerized system in order to extract 3D coordinates of a first point and a second point of the user, the 3D maps indicating a motion of the second point with respect to a display coupled to the computer system, to calculate a line segment that intersects the first point and the second point, to identify a target point where the line segment intersects the display, and to engage an interactive item presented on the display in proximity to the target point.

There is additionally provided, in accordance with an embodiment of the present invention a computer software product including a non-transitory computer-readable medium, in which program instructions are stored, which instructions, when read by a computer, cause the computer to receive a three-dimensional (3D) map of at least a part of a body of a user of the computer, to receive a two dimensional (2D) image of the user, the image including an eye of the user, to extract, from the 3D map and the 2D image, 3D coordinates of a head of the user, and to identify, based on the 3D coordinates of the head and the image of the eye, a direction of a gaze performed by the user.

There is further provided, in accordance with an embodiment of the present invention a computer software product including a non-transitory computer-readable medium, in which program instructions are stored, which instructions, when read by a computer, cause the computer to receive an image including an eye of a user of the computer system, to identify, based the image of the eye, a direction of a gaze performed by the user, to identify, based on the direction of the gaze, a region on a display coupled to the computerized system, and to perform an operation on content presented in the region.

There is also provided, in accordance with an embodiment of the present invention a computer software product including a non-transitory computer-readable medium, in which program instructions are stored, which instructions, when read by a computer, cause the computer to present multiple interactive items on a display coupled to the computer, to receive, from a sensing device coupled to the computer, an input representing a gaze direction of a user, to identify a target point on the display based on the gaze direction, to associate the target point with a first interactive item appearing on the display, and responsively to the target point, to open one or more second interactive items on the display.

There is additionally provided, in accordance with an embodiment of the present invention a computer software product including a non-transitory computer-readable medium, in which program instructions are stored, which instructions, when read by a computer, cause the computer to receive and segment a first sequence of three-dimensional (3D) maps over time of at least a part of a body of a user of the computer in order to extract 3D coordinates of a first point and a second point of the user, the 3D maps indicating a motion of the second point with respect to a display coupled to the computer, to calculate a line segment that intersects the first point and the second point, to identify a target point where the line segment intersects the display, and to engage an interactive item presented on the display in proximity to the target point.

BRIEF DESCRIPTION OF THE DRAWINGS

The disclosure is herein described, by way of example only, with reference to the accompanying drawings, wherein.

DETAILED DESCRIPTION OF EMBODIMENTS

Overview

When using physical tactile input devices such as buttons, rollers or touch screens, a user typically engages and disengages control of a user interface by touching and/or manipulating the physical device. Embodiments of the present invention describe pointing gestures for engaging interactive items presented on a display coupled to a computer executing a mixed modality user interface that includes three-dimensional (3D) sensing, by a 3D sensor, of motion or change of position of one or more body parts, typically a hand or a finger, of the user. Pointing gestures described herein include Point-Select, Point-Touch and Point-Hold gestures that are explained in detail hereinbelow.

The Point-Select gesture enables the user to select an interactive item presented on the display. For example, using the Point-Select gesture, the user can start watching a movie by performing the Point-Select gesture toward an icon (on the display) associated with the move. The Point-Touch gesture enables the user to manipulate an interactive item presented on the display. For example, the user can horizontally scroll a list of interactive items (e.g., movies) presented on the display by manipulating a horizontal scroll box via the Point-Touch gesture. The Point-Hold gesture enables the user to view context information for an interactive item presented on the display. For example, in response to the user performing a Point-Hold gesture on an icon representing a movie, the computer can present a pop-up window including information such as a plot summary, a review, and cast members. In some embodiments, the mixed modality user interface may also convey visual feedback as the user performs the pointing gestures described supra.

While interacting with traditional two-dimensional (2D) user interfaces, the physical devices described supra typically convey tactile feedback to the user. However, while interacting with a 3D user interface such as the mixed modality user interface described herein, the user may perform gestures without engaging any physical device, and therefore not receive any tactile feedback. Embodiments of the present invention provide methods and systems for interacting with items presented on a display, and receiving non-tactile feedback, thereby compensating for the lack of tactile feedback.

System Description

Figure 1:
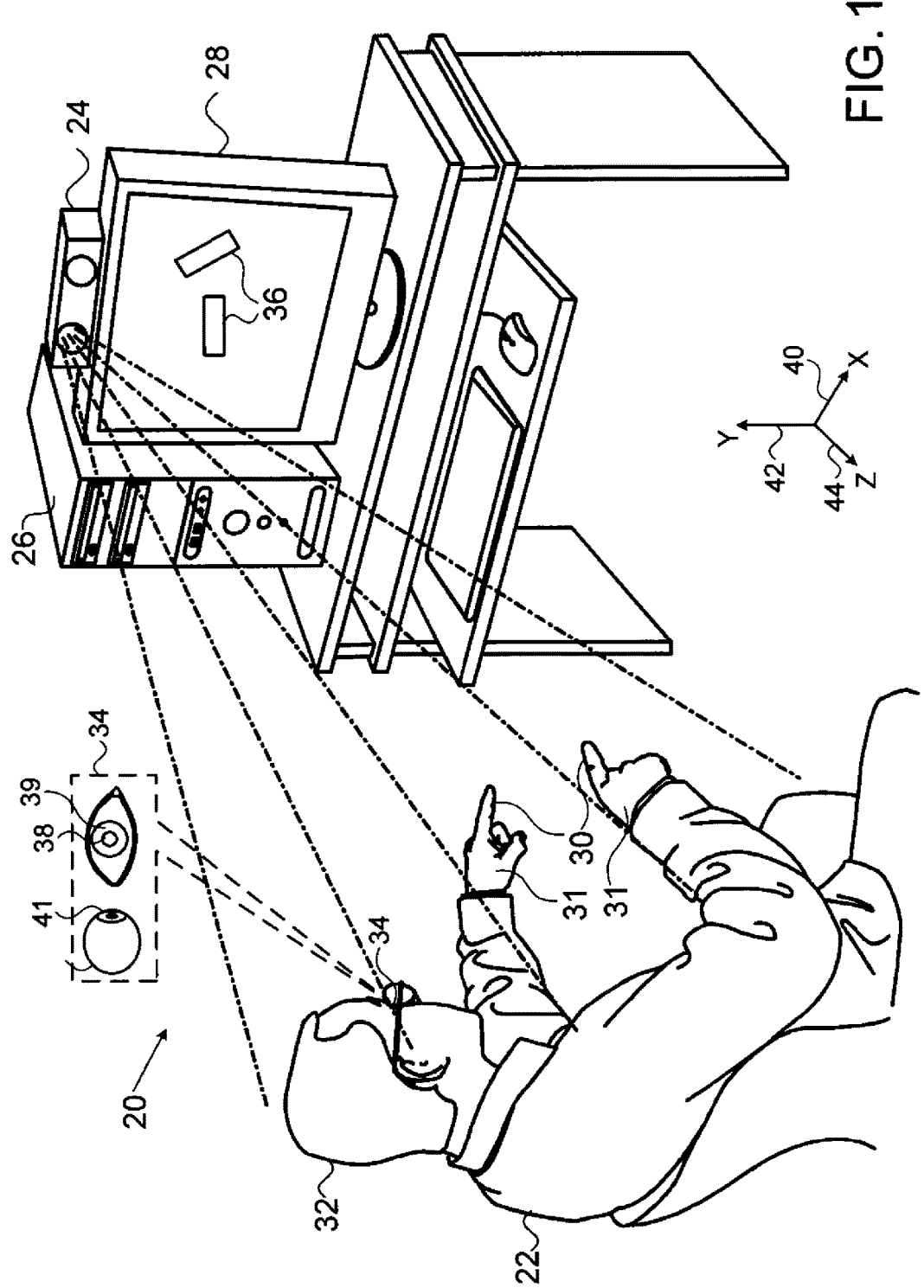
FIG. 1 is a schematic, pictorial illustration of a computer system implementing a mixed-modality user interface, in accordance with an embodiment of the present invention.

FIG. 1 is a schematic, pictorial illustration of a mixed-modality user interface 20 for operation by a user 22 of a computer 26, in accordance with an embodiment of the present invention. (Although for the sake of simplicity, only a single user and user interface are shown in the figure, in practice interface 20 may interact with multiple users concurrently. Alternative embodiments of the present invention may use different user interfaces and/or support multiple user interfaces across different devices). User interface 20 in the pictured embodiment is based, by way of example, on a 3D sensing device 24, which captures 3D scene information that includes a body, or at least parts of the body, such as a finger 30, a hand 31, a head 32, or eyes 34. Device 24 or a separate camera (not shown in the figures) may also capture color video images of the scene. The information captured by device 24 is processed by computer 26, which drives a display screen 28 accordingly to present and manipulate on-screen interactive items 36 (also referred to herein as interactive items). Alternatively, the user interface may be used in conjunction with any type of computerized equipment, such as a laptop, a tablet computer, a television, etc.

While FIG. 1 shows computer 26 in a tower configuration, other configurations of the computer are considered to be within the spirit and scope of the present invention. For example, computer 26 may be configured as a desktop computer, a portable computer (e.g., a laptop) or an all-in-one computer.

Computer 26 processes data generated by device 24 in order to reconstruct a 3D map of user 22. The term "3D map" (or equivalently, "depth map") refers to a set of 3D coordinates representing a surface of a given object, in this case the user's body. In one embodiment, device 24 projects a pattern of spots onto the object and captures an image of the projected pattern. Computer 26 then computes the 3D coordinates of points on the surface of the user's body by triangulation, based on transverse shifts of the spots in the imaged pattern. The 3D coordinates are measured, by way of example, with reference to a generally horizontal X-axis 40, a generally vertical Y-axis 42 and a depth Z-axis 44, based on device 24. Methods and devices for this sort of triangulation-based 3D mapping using a projected pattern are described, for example, in PCT International Publications WO 2007/043036, WO 2007/105205 and WO 2008/120217, whose disclosures are incorporated herein by reference. Alternatively, system 20 may use other methods of 3D mapping, using single or multiple cameras or other types of sensors, as are known in the art.

In some embodiments, device 24 detects the location and direction of eyes 34 of user 22, typically by processing and analyzing an image comprising light (typically infrared and/or a color produced by the red-green-blue additive color model) reflecting from one or both eyes 34, in order to find a direction of the user's gaze. In alternative embodiments, computer 26 (either by itself or in combination with device 24) detects the location and direction of the eyes 34 of the user. The reflected light may originate from a light projecting source of device 24, or any other natural (e.g., sunlight) or artificial (e.g., a lamp) source. Using techniques that are known in the art such as detecting pupil center and corneal reflections (PCCR), device 24 may process and analyze an image comprising light reflecting from an element of eye 34, such as a pupil 38, an iris 39 or a cornea 41, in order to find the direction of the user's gaze. Additionally, device 24 may convey (to computer 26) the light reflecting from the cornea as a glint effect.

The location and features of the user's head (e.g., an edge of the eye, a nose or a nostril) that are extracted by computer 26 from the 3D map may be used in finding coarse location coordinates of the user's eyes, thus simplifying the determination of precise eye position and gaze direction, and making the gaze measurement more reliable and robust. Furthermore, computer 26 can readily combine the 3D location of parts of head 32 (e.g., eye 34) that are provided by the 3D map with gaze angle information obtained via eye part image analysis in order to identify a given on-screen object 36 at which the user is looking at any given time. This use of 3D mapping in conjunction with gaze tracking allows user 22 to move head 32 freely while alleviating the need to actively track the head using sensors or emitters on the head, as in some eye tracking systems that are known in the art.

By tracking eye 34, embodiments of the present invention may reduce the need to re-calibrate user 22 after the user moves head 32. In some embodiments, computer 26 may use depth information for head 32, eye 34 and pupil 38, in order to track the head's movement, thereby enabling a reliable gaze angle to be calculated based on a single calibration of user 22. Utilizing techniques that are known in the art such as PCCR, pupil tracking, and pupil shape, computer 26 may calculate a gaze angle of eye 34 from a fixed point of head 32, and use the head's location information in order to re-calculate the gaze angle and enhance the accuracy of the aforementioned techniques. In addition to reduced recalibrations, further benefits of tracking the head may include reducing the number of light projecting sources and reducing the number of cameras used to track eye 34.

Computer 26 typically comprises a general-purpose computer processor, which is programmed in software to carry out the functions described hereinbelow. The software may be downloaded to the processor in electronic form, over a network, for example, or it may alternatively be provided on non-transitory tangible computer-readable media, such as optical, magnetic, or electronic memory media. Alternatively or additionally, some or all of the functions of the computer processor may be implemented in dedicated hardware, such as a custom or semi-custom integrated circuit or a programmable digital signal processor (DSP). Although computer 26 is shown in FIG. 1, by way of example, as a separate unit from sensing device 24, some or all of the processing functions of the computer may be performed by suitable dedicated circuitry within the housing of the sensing device or otherwise associated with the sensing device.

As another alternative, these processing functions may be carried out by a suitable processor that is integrated with display 28 (in a television set, for example) or with any other suitable sort of computerized device, such as a game console or a media player. The sensing functions of device 24 may likewise be integrated into the computer or other computerized apparatus that is to be controlled by the sensor output.

Various techniques may be used to reconstruct the 3D map of the body of user 22. In one embodiment, computer 26 extracts 3D connected components corresponding to the parts of the body from the depth data generated by device 24. Techniques that may be used for this purpose are described, for example, in U.S. patent application Ser. No. 12/854,187, filed Aug. 11, 2010, whose disclosure is incorporated herein by reference. The computer analyzes these extracted components in order to reconstruct a "skeleton" of the user's body, as described in the above-mentioned U.S. Patent Application Publication 2010/0034457, or in U.S. patent application Ser. No. 12/854,188, filed Aug. 11, 2010, whose disclosure is also incorporated herein by reference. In alternative embodiments, other techniques may be used to identify certain parts of the user's body, and there is no need for the entire body to be visible to device 24 or for the skeleton to be reconstructed, in whole or even in part.

Using the reconstructed skeleton, computer 26 can assume a position of a body part such as a tip of finger 30, even though the body part (e.g., the fingertip) may not be detected by the depth map due to issues such as minimal object size and reduced resolution at greater distances from device 24. In some embodiments, computer 26 can auto-complete a body part based on an expected shape of the human part from an earlier detection of the body part, or from tracking the body part along several (previously) received depth maps.

In some embodiments, the information generated by computer 26 as a result of this skeleton reconstruction includes the location and direction of the user's head, as well as of the arms, torso, and possibly legs, hands and other features, as well. Changes in these features from frame to frame (i.e. depth maps) or in postures of the user can provide an indication of gestures and other motions made by the user. User posture, gestures and other motions may provide a control input for user interaction with interface 20. These body motions may be combined with other interaction modalities that are sensed by device 24, including user eye movements, as described above, as well as voice commands and other sounds. Interface 20 thus enables user 22 to perform various remote control functions and to interact with applications, interfaces, video programs, images, games and other multimedia content appearing on display 28.

Figure 2:
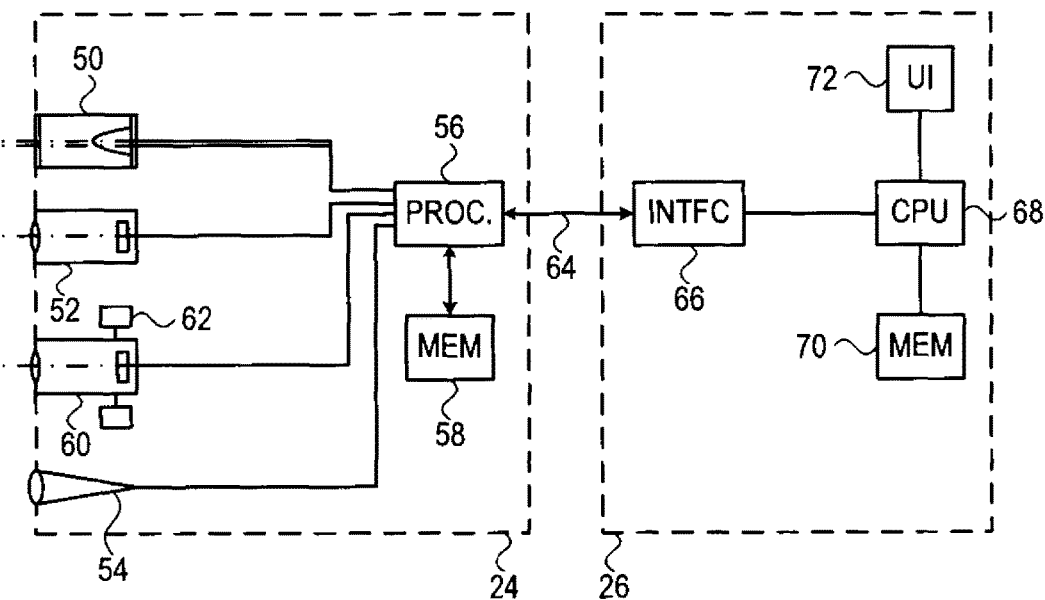
FIG. 2 is a block diagram that schematically illustrates functional components of the computer system implementing the mixed-modality user interface, in accordance with an embodiment of the present invention.

FIG. 2 is a block diagram that schematically illustrates functional components of user interface 20, in accordance with an embodiment of the present invention. Sensing device 24 comprises an illumination subassembly 50, which projects a pattern onto the scene of interest. A depth imaging subassembly 52, such as a suitably-configured video camera, captures images of the pattern on the scene. Typically, illumination subassembly 50 and imaging subassembly 52 operate in the infrared range, although other spectral ranges may also be used. Optionally, a color video camera (not shown) in device 24 captures 2D color images of the scene, and a microphone 54 may also capture sound.

A processor 56 receives the images from subassembly 52 and compares the pattern in each image to a reference pattern stored in a memory 58. The reference pattern is typically captured in advance by projecting the pattern onto a reference plane at a known distance from device 24. Processor 56 computes local shifts of parts of the pattern over the area of the 3D map and translates these shifts into depth coordinates. Details of this process are described, for example, in PCT International Publication WO 2010/004542, whose disclosure is incorporated herein by reference. Alternatively, as noted earlier, device 24 may be configured to generate 3D maps by other means that are known in the art, such as stereoscopic imaging, sonar-like devices (sound based/acoustic), wearable implements, lasers, or time-of-flight measurements.

Processor 56 typically comprises an embedded microprocessor, which is programmed in software (or firmware) to carry out the processing functions that are described hereinbelow. The software may be provided to the processor in electronic form, over a network, for example; alternatively or additionally, the software may be stored on non-transitory tangible computer-readable media, such as optical, magnetic, or electronic memory media. Processor 56 also comprises suitable input and output interfaces and may comprise dedicated and/or programmable hardware logic circuits for carrying out some or all of its functions. Details of some of these processing functions and circuits that may be used to carry them out are presented in the above-mentioned Publication WO 2010/004542.

In some embodiments, a gaze sensor 60 detects the gaze direction of eyes 34 of user 22 by capturing and processing two dimensional images of user 22. In alternative embodiments, computer 26 detects the gaze direction by processing a sequence of 3D maps conveyed by device 24. Sensor 60 may use any suitable method of eye tracking that is known in the art, such as the method described in the above-mentioned U.S. Pat. No. 7,762,665 or in U.S. Pat. No. 7,809,160, whose disclosure is incorporated herein by reference, or the alternative methods described in references cited in these patents. For example, sensor 60 may capture an image of light (typically infrared light) that is reflected from the fundus and/or the cornea of the user's eye or eyes. This light may be projected toward the eyes by illumination subassembly 50 or by another projection element (not shown) that is associated with sensor 60. Sensor 60 may capture its image with high resolution over the entire region of interest of user interface 20 and may then locate the reflections from the eye within this region of interest. Alternatively, imaging subassembly 52 may capture the reflections from the user's eyes (ambient light, reflection from monitor) in addition to capturing the pattern images for 3D mapping.

As another alternative, processor 56 may drive a scan control 62 to direct the field of view of gaze sensor 60 toward the location of the user's face or eye 34. This location may be determined by processor 60 or by computer 26 on the basis of a depth map or on the basis of the skeleton reconstructed from the 3D map, as described above, or using methods of image-based face recognition that are known in the art. Scan control 62 may comprise, for example, an electromechanical gimbal, or a scanning optical or optoelectronic element, or any other suitable type of scanner that is known in the art, such as a microelectromechanical system (MEMS) based mirror that is configured to reflect the scene to gaze sensor 60.

In some embodiments, scan control 62 may also comprise an optical or electronic zoom, which adjusts the magnification of sensor 60 depending on the distance from device 24 to the user's head, as provided by the 3D map. The above techniques, implemented by scan control 62, enable a gaze sensor 60 of only moderate resolution to capture images of the user's eyes with high precision, and thus give precise gaze direction information.

In alternative embodiments, computer 26 may calculate the gaze angle using an angle (i.e., relative to Z-axis 44) of the scan control. In additional embodiments, computer 26 may compare scenery captured by the gaze sensor 60, and scenery identified in 3D depth maps. In further embodiments, computer 26 may compare scenery captured by the gaze sensor 60 with scenery captured by a 2D camera having a wide field of view that includes the entire scene of interest. Additionally or alternatively, scan control 62 may comprise sensors (typically either optical or electrical) configured to verify an angle of the eye movement.

Processor 56 processes the images captured by gaze sensor 60 in order to extract the user's gaze angle. By combining the angular measurements made by sensor 60 with the 3D location of the user's head provided by depth imaging subassembly 52, the processor is able to derive accurately the user's true line of sight in 3D space. The combination of 3D mapping with gaze direction sensing reduces or eliminates the need for precise calibration and comparing multiple reflection signals in order to extract the true gaze direction. The line-of-sight information extracted by processor 56 enables computer 26 to identify reliably the interactive item at which the user is looking.

The combination of the two modalities can allow gaze detection without using an active projecting device (i.e., illumination subassembly 50) since there is no need for detecting a glint point (as used, for example, in the PCCR method). Using the combination can solve the glasses reflection known problem of other gaze methods that are known in the art. Using information derived from natural light reflection, the 2D image (i.e. to detect the pupil position), and the 3D depth map (i.e., to identify the head's position by detecting the head's features), computer 26 can calculate the gaze angle and identify a given interactive item 36 at which the user is looking.

As noted earlier, gaze sensor 60 and processor 56 may track either one or both of the user's eyes. If both eyes 34 are tracked with sufficient accuracy, the processor may be able to provide an individual gaze angle measurement for each of the eyes. When the eyes are looking at a distant object, the gaze angles of both eyes will be parallel; but for nearby objects, the gaze angles will typically converge on a point in proximity to an object of interest. This point may be used, together with depth information, in extracting 3D coordinates of the point on which the user's gaze is fixed at any given moment.

As mentioned above, device 24 may create 3D maps of multiple users who are in its field of view at the same time. Gaze sensor 60 may similarly find the gaze direction of each of these users, either by providing a single high-resolution image of the entire field of view, or by scanning of scan control 62 to the location of the head of each user.

Processor 56 outputs the 3D maps and gaze information via a communication link 64, such as a Universal Serial Bus (USB) connection, to a suitable interface 66 of computer 26. The computer comprises a central processing unit (CPU) 68 with a memory 70 and a user interface 72, which drives display 28 and may include other components, as well. As noted above, device 24 may alternatively output only raw images, and the 3D map and gaze computations described above may be performed in software by CPU 68. Middleware for extracting higher-level information from the 3D maps and gaze information may run on processor 56, CPU 68, or both. CPU 68 runs one or more application programs, which drive user interface 72 based on information provided by the middleware, typically via an application program interface (API). Such applications may include, for example, games, entertainment, Web surfing, and/or office applications.

Although processor 56 and CPU 68 are shown in FIG. 2 as separate functional elements with a certain division of processing tasks between them, the functions of the processor and CPU may alternatively be carried out by a single processing unit, or these functions may be divided among three or more processing units. Furthermore, although device 24 is shown as containing a certain combination of components in a particular arrangement, other device configurations may be used for the purposes described herein, and are considered to be within the scope of the present invention.

Gaze Detection

Figure 3:
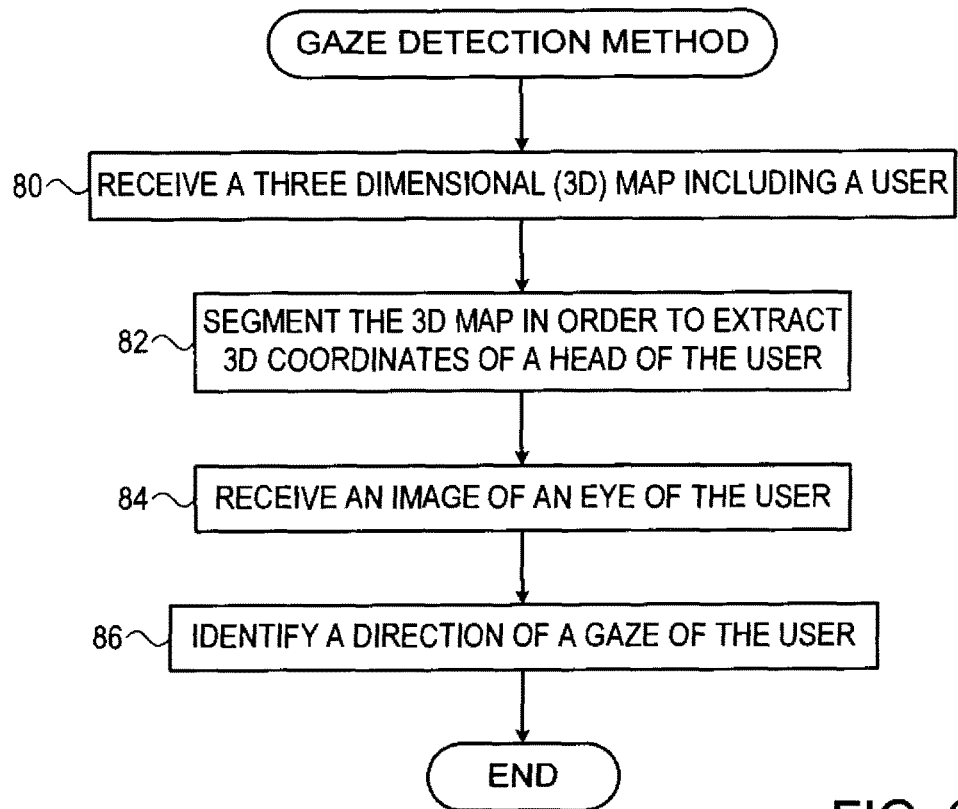
FIG. 3 is a flow diagram that schematically illustrates a method of detecting a direction of a gaze of a user, in accordance with an embodiment of the present invention.

FIG. 3 is a flow diagram that schematically illustrates a method of detecting a direction of a gaze of user 22, in accordance with an embodiment of the present invention. In an initial step 80, computer 26 receives, from depth imaging subassembly 52, a 3D map including at least a body part of user 22, and in an extraction step 82, the computer segments the received 3D map in order to extract 3D coordinates of head 32. In a receive step 84, computer 26 receives, from gaze sensor 60, a two dimensional image of the user including eye 34. As described supra, illumination subassembly 50 may project a light toward user 22, and the received image may comprise light reflected off the fundus and/or the cornea of eye(s) 34. In an identification step 86, computer 26 analyzes the received depth map and image in order to identify a gaze direction of user 22, and the method ends.

In some embodiments, computer 26 extracts the 3D coordinates of head 32 by identifying, from the 3D map, a position of the head along X-axis 40, Y-axis 42 and Z-axis 44. In alternative embodiments, computer 26 extracts the 3D coordinates of head 32 by identifying, from the 2D image a first position of the head along X-axis 40 and Y-axis 42, and identifying, from the 3D map, a second position of the head along Z-axis 44.

Embodiments of the present invention can use gaze detection to controlling a function of a computerized system such as computer 26 responsively to the direction of the gaze. In some embodiments, computer 26 can identify a given interactive item 36 presented, on display 28, at a position in the direction of the gaze, and change a state of the given interactive item responsively to the direction of the gaze.

In a first embodiment, changing the state of the given interactive item 36 may comprise performing an operation associated with the given interactive item. For example, interactive items 36 may comprise menu choices that user 22 can select to present specific content (e.g., a movie or a television show) on display 28. In a second embodiment, computer 26 can change the state of a given interactive item 36 by directing input received from the user to the given interactive item. For example, the given interactive item may comprise a text box, and if the user is gazing at the text box, computer 26 can direct any alphanumeric input received from a keyboard to the text box.

In alternative embodiments, computer 26 can identify a given interactive item 36 presented, on display 28, at a position in the direction of the gaze, and change a state of the given interactive item responsively to a vocal command received from the user. For example, the given interactive item may comprise an icon associated with a software application, and the user can gaze at the icon and say the word "start" to execute the application. In additional embodiments, user interface 20 may be configured to identify a given interactive item 36 responsively to the direction of the gaze, and to manipulate the given interactive item responsively to a gesture performed by a limb (e.g., finger 30 or hand 31). For example, after selecting the given interactive item, if the computer receives a sequence of 3D maps indicating that the user is moving hand 30 in a swiping motion (i.e., along a plane comprising X-axis 40 and Y-axis 42), computer 26 can responsively reposition the selected interactive item in the direction of the swipe (e.g., left to right).

In further embodiments, embodiments of the present invention may be used to receive an image (either a 2D image or a 3D map) including eye 34, identify, based on the image, a gaze direction, identify, based on the gaze direction a region on the display and in the direction of the gaze, and perform an operation on the region. For example, computer 26 may comprise a tablet computer incorporating a digital camera, display 28 may comprise a display for the tablet, and the camera may be configured to focus the camera's lens on an item presented in the identified region.

Additionally or alternatively, computer 26 can identify a device coupled to the computer and positioned in the direction of the gaze, and controlling a function of the device responsively to the direction of the gaze. For example, if the user gazes at a top of a speaker coupled to the computer, the computer can raise the volume level of the speaker, and if the user gazes at the bottom of the speaker, the computer can lower the volume level.

Figure 4:
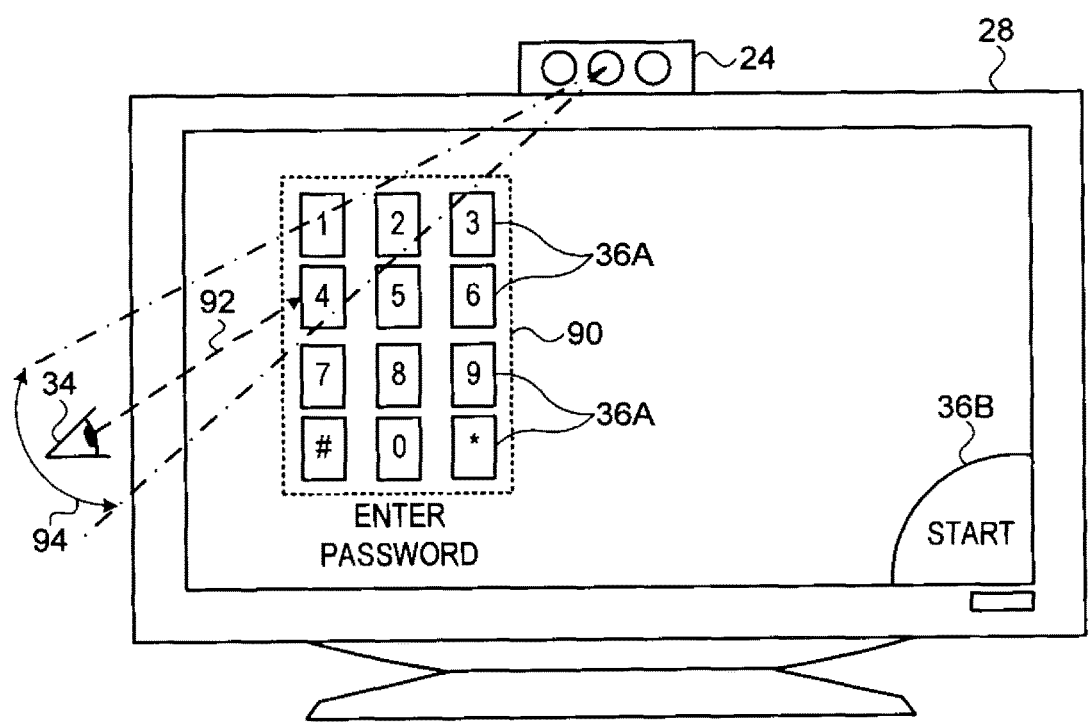
FIG. 4 is a schematic representation of a numeric keypad configured for entering a password, in accordance with an embodiment of the present invention.

FIG. 4 is a schematic representation of a numeric keypad 90 presented on display 28, configured for entering a password, in accordance with an embodiment of the present invention. The presence and gaze of user 22 in this and subsequent figures is represented by eye 34, having a line of sight 92. Sensing device 24 determines the line of sight by finding the 3D location of the user's head and the gaze direction of eye 34 within a field of view 94 of the device, as described above.

In the description herein, interactive items 36 may be differentiated by using a different description (e.g., icon or scroll box instead of interactive item) and appending a letter to the identifying numeral. For example, in FIG. 4, interactive items 46 comprise numeric input keys 36A and a start button 36B. Upon presenting the input keys and the start button, computer 26 prompts user 22 to enter a password. Although numeric keys are shown in FIG. 4, any sort of on-screen graphical elements may be used as "keys" for this purpose. When the user wishes to initiate operation of computer 26 or of a particular application executing on the computer, the user can direct his gaze from one given key 36A to the next in the proper sequence in order to enter a password. Optionally, the user may make a particular hand gesture or voice command (such as "ENTER") as his gaze rests on each given key 36A (i.e., in a sequence of keys comprising the password), in order to inform device 24 to record the selection.

In some embodiments, computer 26 can be configured to select a sequence of interactive items 36 (e.g., as the user moves his gaze from one interactive item to the next) with or without any additional input (i.e., a gesture or sound) made by the user to indicate which of the interactive item has been selected. Similarly, computer 26 can be configured not to provide any visual or audio feedback to the user indicating the selection. As a result, even if the user enters a password in a public place, onlookers will be unable to determine or copy the password.

After entering the password, the user may direct his gaze toward start button 36B in order to continue interacting with the computer.

In addition to password entry, gaze detection can be used to enhance security in other ways. For example, computer 26 may learn the user's characteristic eye movement patterns and/or other biometric features of the eyes 34 as an additional means of identification. As another example, device 24 may be configured to find the gaze angle not only of user 22, but also of other people positioned within field of view 94 (as identified by skeleton reconstruction from the 3D maps, for instance). In this case, device 24 may be configured to alert user 22 when another person is looking at display 28 (and may even prompt computer 26 to display an image of this other person, captured by device 24, on the display). This sort of functionality can assist user 22 in protecting himself from eavesdropping and in deterring eavesdroppers from continuing to look at the display.

As a power saving feature, device 24 may detect when the user is not looking at display 28, and computer 26 may activate power saving techniques when the user looks away for more than some threshold period of time. For example, computer 26 may dim or darken the display (i.e., decrease the brightness) entirely when the user is not looking at the display. When the user looks back toward the display, the computer may deactivate the power saving techniques. For example, computer 26 may increase the brightness to return it to full brightness upon detecting that user 22 returned his gaze toward display. This sort of gaze-dependent screen control is also useful in enhancing battery life of portable devices and reducing power consumption generally for cost saving and environmental friendliness.

Gaze Operated User Interface

Gaze tracking may be used to create an interactive user interface that can detect which on-screen interactive item the user is looking at (such as a text box, or an application such as a word processor), thereby obviating the need for a mouse and/or a keyboard. For example, when the user types text, the text is automatically directed to the text box at which the user is looking. As another example, when the user makes the first keystroke in a word or sentence, a "mouse click" type event is sent to the looked-at text box, which causes the text to be typed into the text box. In this manner the user may fill in a Web form without the need to move the mouse to switch from field to field ("first name" to "last name" to "password," etc.).

Furthermore, the combination of gaze tracking with other modalities, such as 3D mapping/gesture detection and/or voice detection, enables the user to control on-screen objects fully, without the use of a mouse or a touch screen. In this manner, the user can perform a full range of pointing and selection functions, including searching through large numbers of information items and choices. The combined interface modalities may also be used to search and perform control functions within the context of a certain interactive item, such as performing find, cut, copy and paste functions within an open file.

Figure 5:
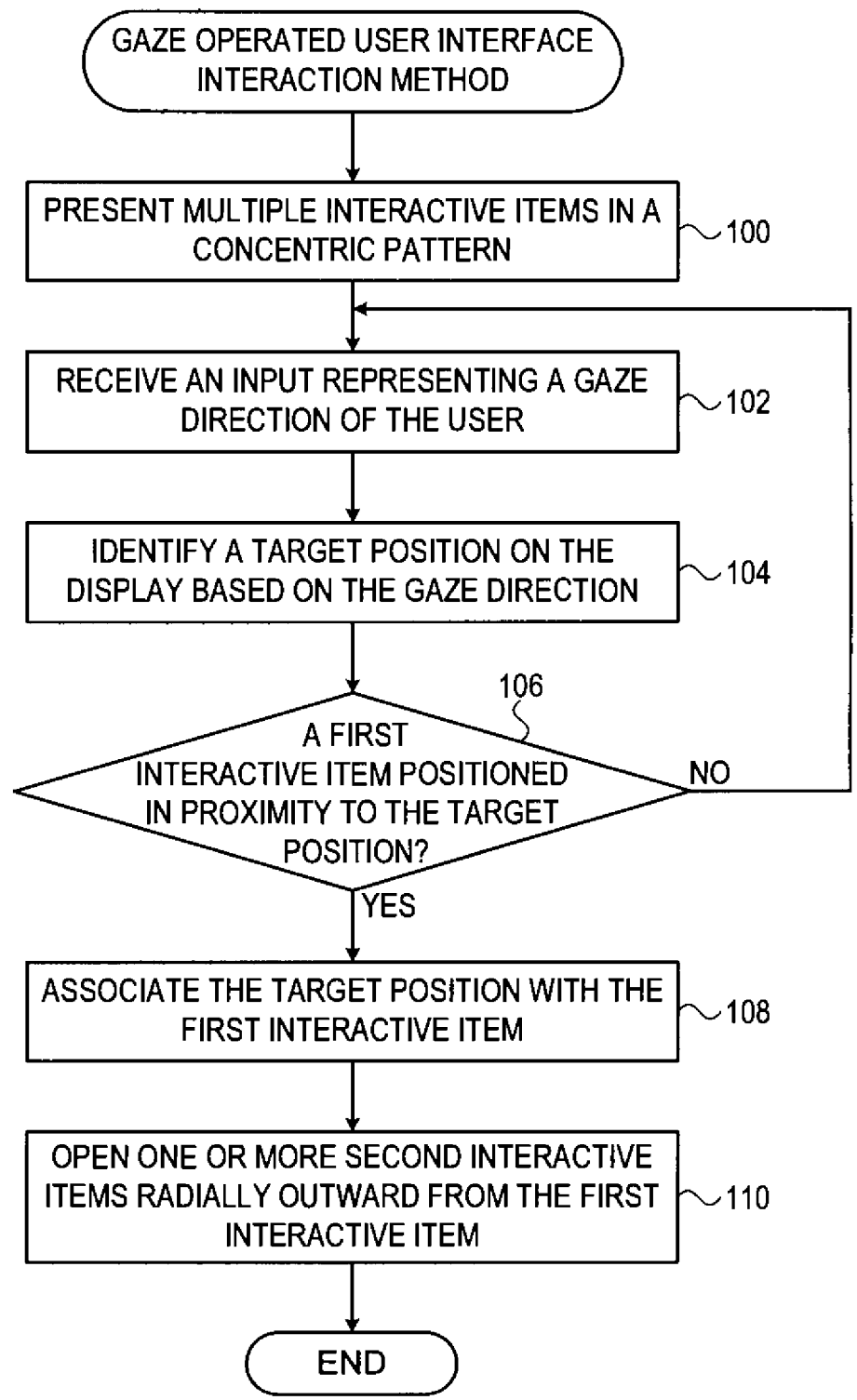
FIG. 5 is a flow diagram that schematically illustrates a method of interacting with a gaze operated user interface, in accordance with an embodiment of the present invention.
Figure 6A:
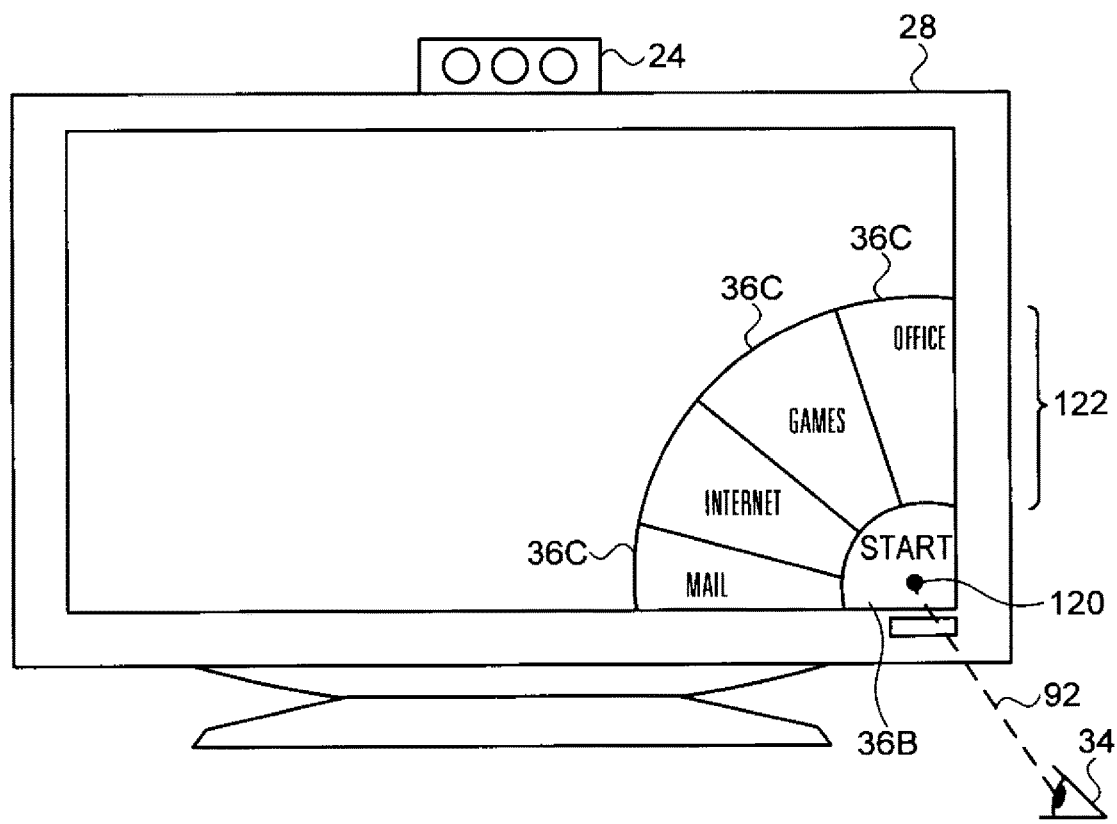
FIGS. 6A-6C are schematic representations illustrating a sequence of operations performed using the gaze operated user interface, in accordance with an embodiment of the present invention.
Figure 6B:
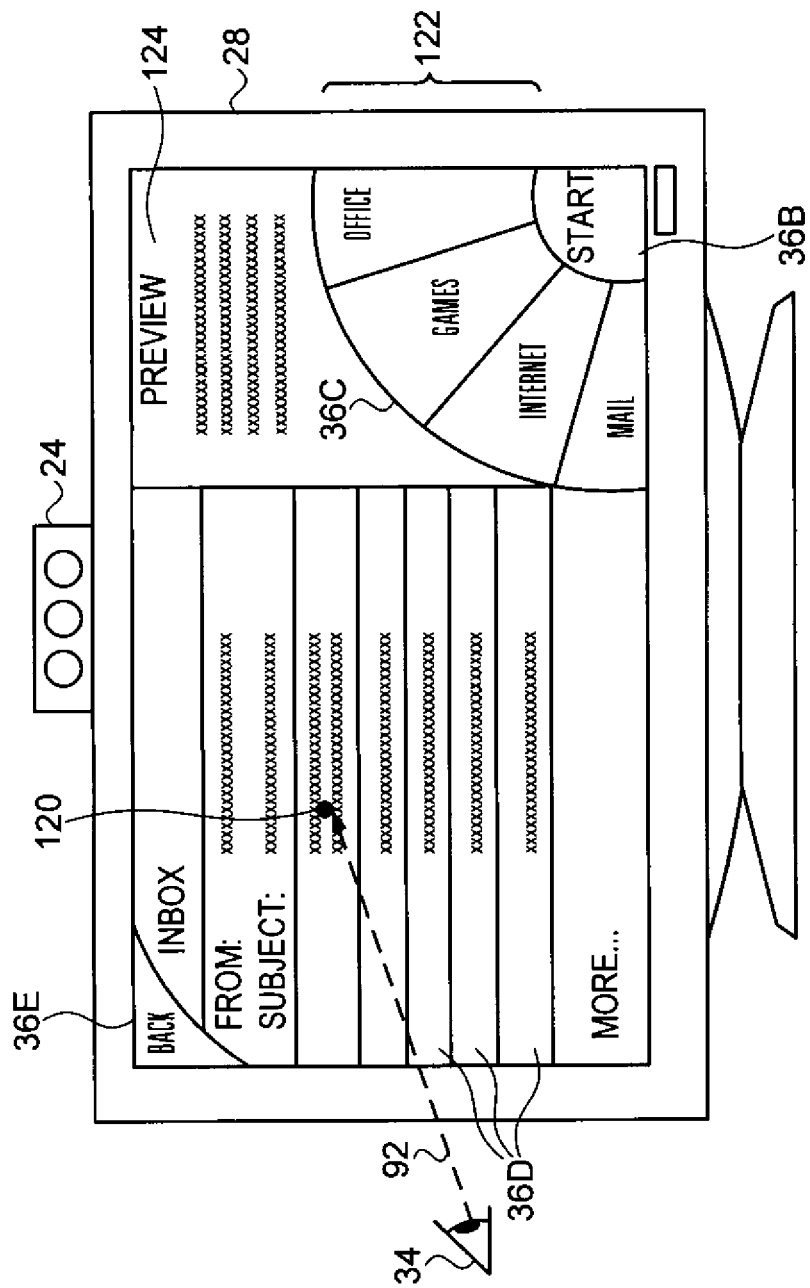
Figure 6C:
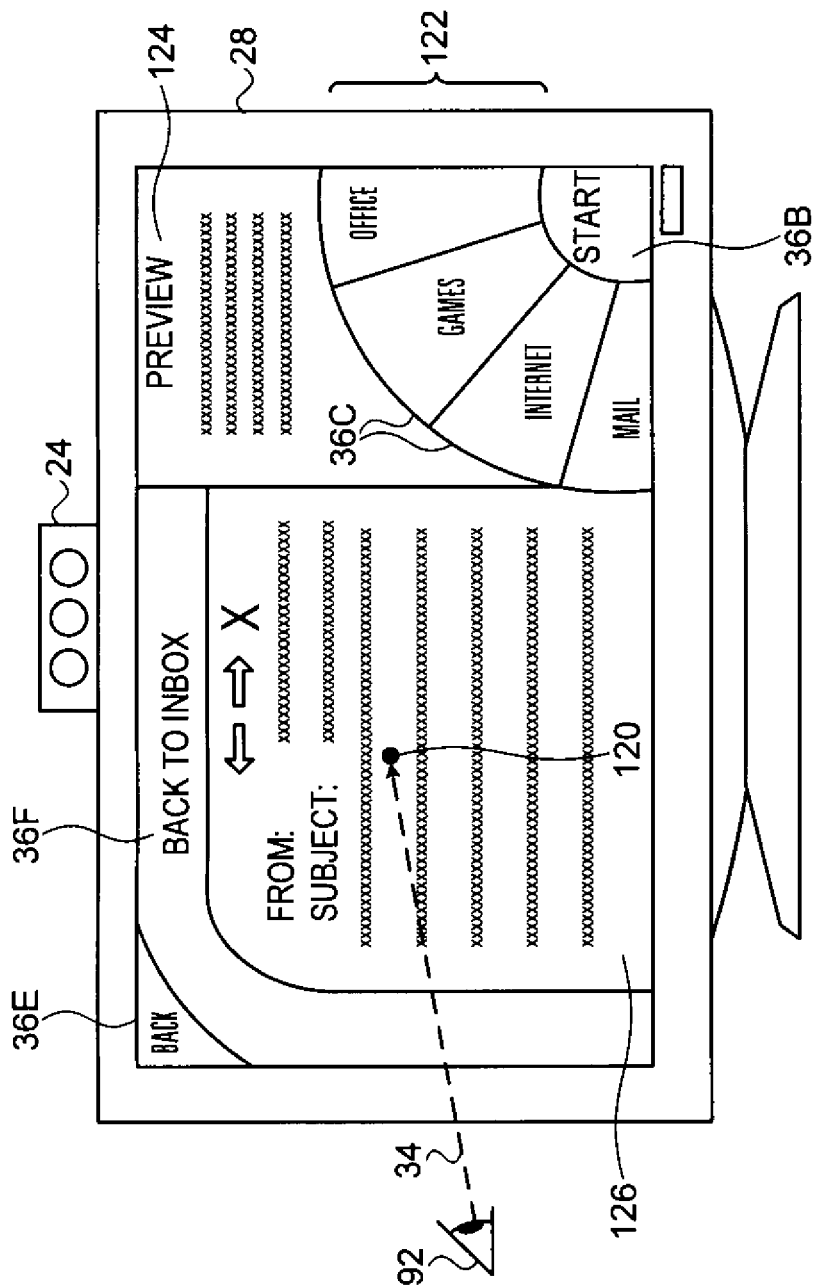

FIG. 5 is a flow diagram that schematically illustrates a method of interacting with a gaze operated user interface, in accordance with an embodiment of the present invention, and FIGS. 6A-6C are schematic representations illustrating a sequence of operations performed using a gaze operated user interface, in accordance with an embodiment of the present invention. In an initialization step 100, a computerized system such as computer 26 presents multiple interactive items 36 on display 28. In the configuration shown in FIGS. 6A-6C, computer 26 initially presents start button 36B in the lower right corner of display 28. As user 22 directs his line of sight 92 toward start button 36B, computer 26 receives an input (e.g., depth maps) indicating a gaze direction of user 22 in a receive step 102. Upon determining the gaze direction, computer 26 identifies a target point 120 on display 28 based on the gaze direction (i.e., a point on the display that the user is looking at) in an identification step 104.

In a comparison step 106, if a first interactive item 36 is in proximity to target point, then in an association step 108, computer 26 associates the target point with the first interactive item. In the example shown in FIG. 6A, the first interactive item comprises start button 36B, and target point 120 is positioned on the start button 36. Returning to step 106, if the target point is not in proximity to any of the interactive items, then the method continues with step 102.

In a response step 110, computer 26 opens (i.e., presents) one or more second interactive items 36 in proximity to the first interactive item, and the method ends. Computer 26 can the select one of the second interactive items responsively to the user adjusting the gaze direction so that the target point is in proximity to the one of the second interactive items.

While the configuration of the interactive user interface in FIGS. 6A-6B 36 show computer 26 presenting the second interactive items 36 radially outward from the first interactive item in a concentric pattern, other configurations are considered to be within the spirit and scope of the present invention. For example, computer 26 may present the first and second interactive items as nested rectangular icons.

In some embodiments, computer 26 can open the one or more second interactive items responsively to a gesture performed by a limb (e.g., finger 30 or hand 31). For example, after associating the target point with the first interactive item, if the computer receives a sequence of 3D maps indicating that the user is moving hand 30 in a swiping motion (i.e., along a plane comprising X-axis 40 and Y-axis 42), computer 26 can responsively open the one or more second interactive items.

In the configuration shown in FIG. 6A, computer 26 presents a menu area 122 of second interactive items comprising tabs 36C (arranged in a concentric pattern) for various applications that are available on the computer. In some embodiments, computer 26 opens menu area 122 in response to the user gazing at target point 120, without necessarily requiring the user to make any sort of physical gesture or voice command.

In FIG. 6B, user 22 has directed his line of sight 92 toward a MAIL tab 36C, thus causing computer 26 to automatically open the user's electronic mail (e-mail) inbox, which contains listings 36D of incoming mail items. As the user scans his gaze up and down over listings 36D and brings line of sight 92 to rest on a particular listing 36D, the computer automatically presents a preview 124 of the content of the mail item represented by the listing. The user may preview other listings 36D by moving his line of sight 92 up or down, or may return to the main menu by directing his line of sight 92 to a BACK button 36E. All of these actions may be performed by eye movement alone.

To open a selected mail item, the user may input a command to computer 26 by another modality. For example, the user may say "OPEN," or may make an opening hand gesture while gazing at the listing 36D corresponding to the mail item. Sensing device 24 detects the audio input or the 3D motion made by the user and inputs the appropriate command to computer 26. As a result, the screen shown in FIG. 6C opens, presenting full content 126 of the selected mail item. The user may return to the inbox from this point by moving his gaze to a "BACK TO INBOX" area 36F, or may return to the main menu using BACK button 36E, as mentioned above.

When selecting a given interactive item 36, computer 26 can convey visual feedback to the user indicating the selection (i.e., before performing an action such as presenting full content 126). Examples of visual feedback include changing the size and/or appearance of the selected item, or highlighting the selected item by surrounding the selected item with a border. Conveying visual feedback enables user 22 to focus his gaze in the vicinity of the target point, thereby enhancing the user experience. For example, when the user selects start button 36B, computer 26 can convey visual feedback via the start button, thereby directing the user to maintain his gaze in proximity to where the computer presents tabs 36C in menu area 122.

Gaze Related Pointing Gestures

As described in detail hereinbelow, user 22 points to a given interactive item 36 while performing the Point-Select, Point-Touch and Point-Context gestures. In embodiments of the present invention, computer 26 identifies where the user is pointing by defining a line between a first point and a second point of the user, and identifying where (i.e., target point 120) the line intersects display 28.

Figure 7:
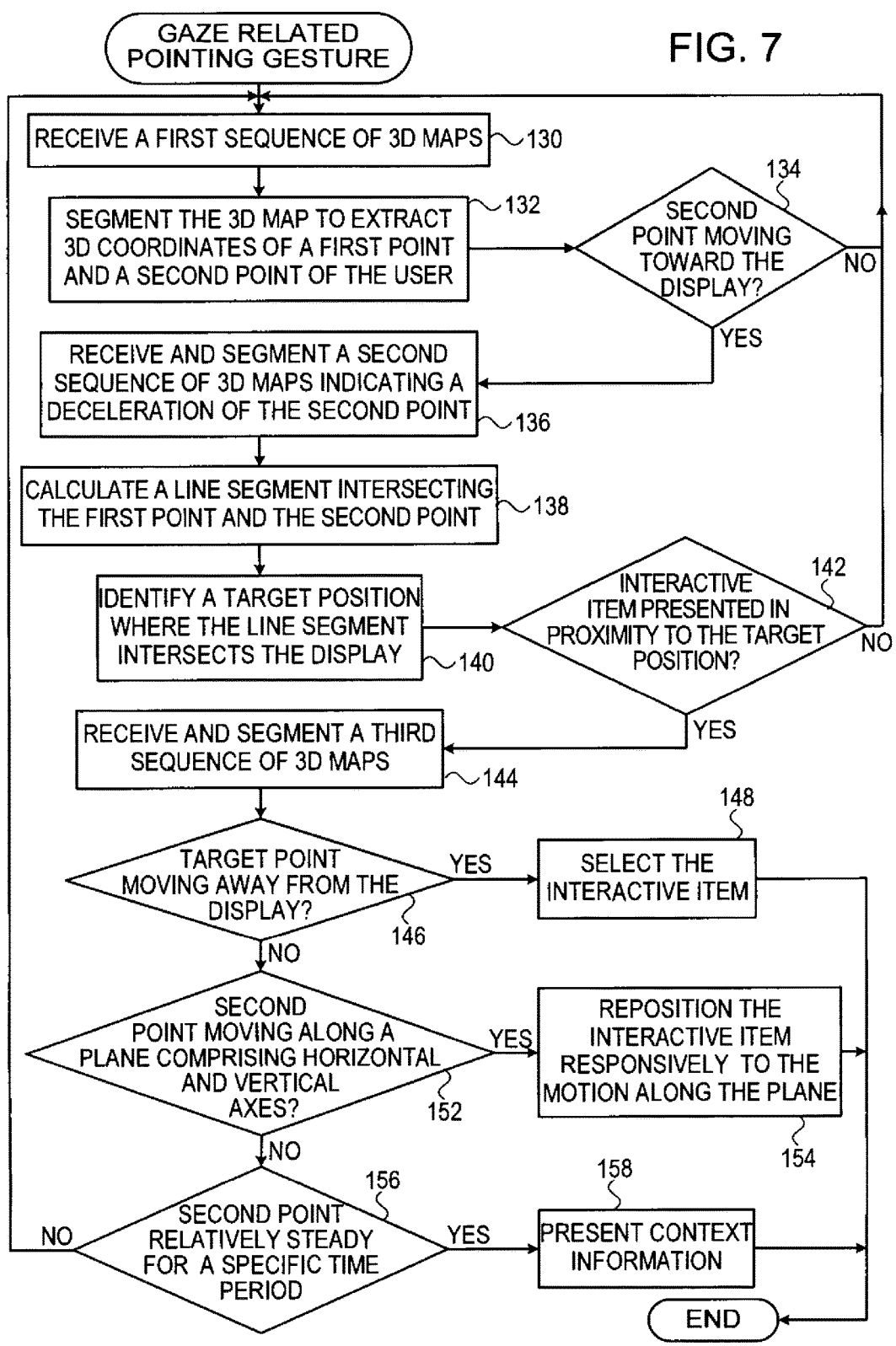
FIG. 7 is a flow diagram that schematically illustrates a method of detecting a gaze related pointing gesture, in accordance with an embodiment of the present invention.
Figure 8:
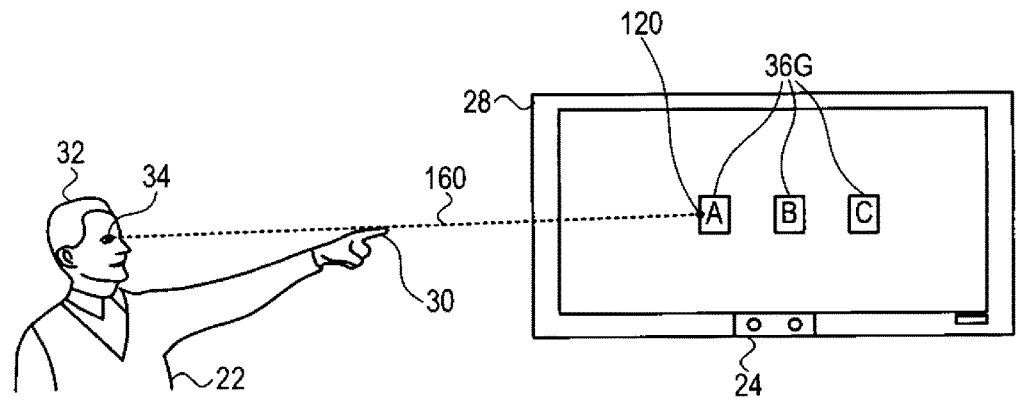
FIG. 8 is a schematic pictorial illustration of the user performing a Point-Select gesture to select a first given interactive item, in accordance with an embodiment of the present invention.
Figure 9:
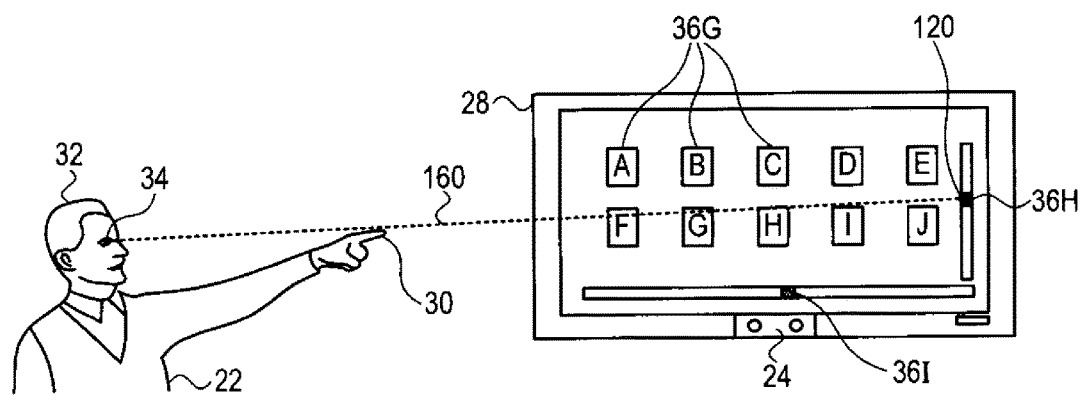
FIG. 9 is a schematic pictorial illustration of the user performing a Point-Touch gesture to manipulate a second given interactive item, in accordance with an embodiment of the present invention.

FIG. 7 is a flow diagram that schematically illustrates a method of detecting a gaze related pointing gesture, in accordance with an embodiment of the present invention, FIG. 8 is a schematic pictorial illustration of user 22 performing a Point-Select gesture to select a first given interactive item 36 presented on display 28, in accordance with an embodiment of the present invention, and FIG. 9 is a schematic pictorial illustration of user 22 performing a Point-Touch gesture to manipulate a second given interactive item 36 presented on display 28, in accordance with an embodiment of the present invention. Examples of the first interactive items that user 22 can select using the Point-Select gesture include icons 36G, and examples of the second interactive items that user 22 can manipulate using the Point-Touch gesture include icons 36G, a vertical scroll box 36H and a horizontal scroll box 36I.

The Point-Select gesture comprises user 22 pointing a given finger 30 (typically an index finger) toward the first given interactive item 36, moving finger 30 (typically along Z-axis 44) toward the first given interactive item, stopping or slowing down the finger, and then pulling the finger back to the user. The Point-Touch gesture comprises user 22 pointing finger toward a second given interactive item 36, moving finger 30 (typically along Z-axis 44) toward the second given interactive item, pausing the finger, and then moving the hand along a plane comprising X-axis 40 and Y-axis 42.

In a first receive step 130, a computerized system such as computer 26 receives a first sequence of 3D maps that include user 22, and in an extraction step 132, the computer segments the received 3D maps to extract 3D coordinates of the first point and the second point of the user. While FIGS. 8 and 9 show the first point comprising eye 34 and the second point comprising a tip of (index) finger 30, different first points and second points are considered to be within the spirit and scope of the present invention. For example, the first point may comprise a point between eyes 34, or some other point on the user's face, and the second point may comprise any point on any of the user's limbs. For different postures of user 22, computer 26 may use different calculations to identify the first and the second points.

In a first comparison step 134, if the first sequence of 3D maps indicates that the user is moving the second point with respect to (typically toward) display 28, then in a second receive step 136, computer 26 receives and segments a second sequence of 3D maps indicating a deceleration of the second point. In a calculation step 138, computer 26 calculates a line segment 160 that intersects the first point and the second point, and in an identification step 140, the computer extends line segment 160 to display 28, and identifies target point 120 where line segment 160 intersects the display.

In some embodiments, user 22 may not be looking at the target point. For example, computer 26 may determine (i.e., using the gaze detection embodiments described supra) that the user is directing his gaze at a first given interactive item 36 that is presented on the left side of display 28, but step 140 identifies that the user is pointing to a second given interactive 36 that is positioned on the right side of display 28. In this instance, the computer can be configured to select the second interactive item, even though the user is directing his gaze toward the first interactive item.

In a second comparison step 142, if computer 26 is presenting a given interactive item 36 in proximity to target point 120, then the computer engages the given interactive item 36 in proximity to the target point, and receives and segments a third sequence of 3D maps in a third receive step 144. In a third comparison step 146, if the third sequence of 3D maps indicates that the user is moving the second point away from the display (i.e., toward user 22), then in a selection step 148, computer 26 engages (i.e., selects) the given interactive item presented in proximity to target point 120, and the method ends. In the example shown in FIG. 8, user 22 can select the icon "A" using the Point-Select gesture comprising pointing finger 30 at the icon "A", and pulling the finger back.

In some embodiments engaging the given interactive item may comprise performing an action associated with the given interactive item. For example, the given interactive item may comprise a given icon 36G for a movie, and engaging the given icon 36G comprises executing an application to view the movie.

Alternatively, while pointing at the icon "A", user 22 can issue a vocal command such as "Select". Upon receiving the vocal command from microphone 54, computer 26 can perform an operation associated with the given interactive item presented in proximity to target point 120 (e.g., the icon "A").

In some embodiments, computer 26 may select, using the Point-Select gesture, a given interactive item 36, even if the gaze detection embodiments described supra indicate that user is not looking at the given interactive item. In a first example, if computer 26 detects that the user has not changed his gaze direction for a specified time period, and computer 26 identifies a Point-Select gesture while the received 2D image and 3D map do not indicate a gaze direction (e.g., hand 31 is blocking eye 34), then computer 26 may "override" gaze detection and respond to the Point-Select gesture.

In a second example, computer 26 may respond to a Point-Select gesture, if the finger motion gesture is "significant" (i.e., having at least a first specified difference) and if target point 120 is at least a second specified distance from the interactive item presented in the direction of the gaze. For example, if the user is looking at a first interactive item 36 presented on a left side of display 28, and performs a Point-Select gesture to a second interactive item 36 presented on an right side of the display, computer 26 may be configured to engage the second interactive item.

If the third sequence of 3D maps do not indicate that the user is moving the second point away from display 28, then in a fourth comparison step 150, computer 26 analyzes the third sequence of 3D maps to determine if user 22 is moving the second point along an X-Y plane comprising X-axis 40 and Y-axis 42. If the third sequence of 3D maps indicates that the user is moving the second point along the X-Y plane, then in a repositioning step 152, computer 26 repositions the interactive item positioned in proximity to target point 120 responsively to the motion of the second point, and the method ends. In the example shown in FIG. 9, user 22 can move vertical scroll box 36H using the Point-Touch gesture comprising pointing finger 30 at the vertical scroll box, and moving the finger up or down.

If the third sequence of 3D maps do not indicate that the user is moving the second point along the X-Y plane, then in a fifth comparison step 154, computer 26 analyzes the third sequence of 3D maps to determine if user 22 is holding the second point relatively steady for at least a specific time period (e.g., two second). If the third sequence of 3D maps indicates that the user is holding the second point relatively steady for at least the specific time period, then in a presentation step 156, computer 26 performs a hold operation on the for the interactive item positioned in proximity to target point 120. For example, the hold operation may comprise presenting context information for the interactive item positioned in proximity to target point 120. Examples of context information include properties of the interactive item, or options available to the user. For example, computer 26 can present a message "Pull finger back to select, or move finger horizontally or vertically to reposition the item." Another example of the hold operation may comprise computer 26 deleting the interactive item positioned in proximity to target point 120.

Returning to step 154, if the third sequence of 3D maps does not indicate that the user held the second point relatively steady for the specific time period, then the method continues with step 130. Likewise, if computer 26 is not presenting a given interactive item 36 in proximity to target point 120 in step 142, or if the first sequence of 3D maps does not indicate that user 22 is moving the second point toward display 28 in step 134, then the method also continues with step 130.

In some embodiments, computer 26 can control a function of the device coupled to the computer in response to the gestures described herein. For example, if the user performs a Point-Touch gesture in the up direction while pointing toward a speaker coupled to the computer, the computer can raise the volume level of the speaker. Similarly, if the user performs a Point-Touch gesture in the down direction while pointing toward the speaker, the computer can lower the volume level of the speaker.

While the gestures described in the flow diagram of FIG. 7 include the Point-Select and the Point-Touch gestures, other pointing gestures that identify target point 120 via line segment 160 (i.e. intersecting the first and second points) are considered to be within the spirit and scope of the present invention. Additionally or alternatively, the Point-Select and the Point-Touch gestures may be used in conjunction with the gaze detection embodiments described supra.

For example, computer 26 can be configured to select (i.e., Point-Select) a given interactive item 36 upon identifying target position 120 based on the user's gaze, the first sequence of 3D maps indicating user 28 is moving finger 30 toward display 28, the second sequence of 3D maps indicating that the user is decelerating the finger, and the third sequence of 3D maps indicating that the user is moving finger 30 away from the display. Similarly, computer 26 can be configured to responsively reposition (i.e., Point-Touch) a given interactive item 36 upon identifying target position 120 based on the user's gaze, the first sequence of 3D maps indicating user 28 is moving finger 30 toward display 28, the second sequence of 3D maps indicating that the user is decelerating the finger, and the third sequence of 3D maps indicating that the user is moving finger 30 along the plane comprising X-axis 40 and Y-axis 42.

Figure 10:
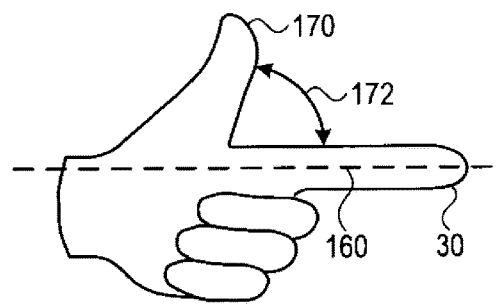
FIG. 10 is a schematic pictorial illustration showing an alternative Point-Select gesture, also referred to herein as a Trigger gesture, in accordance with an embodiment of the present invention.

FIG. 10 is a schematic pictorial illustration showing an alternative Point-Select gesture, also referred to herein as a Trigger gesture in accordance with an embodiment of the present invention. After pointing index finger 30 at a given interactive item 36, user 22 can select the given interactive item by raising or folding a thumb 170 (as indicated by an arrow 172), where folding the thumb completes the gestures (i.e., instead of moving the finger toward the given interactive item). Alternatively, computer 26 can select the given icon upon user 22 pointing finger 30 at the given interactive item, and issuing an audio command to select the given interactive item (e.g., the user utters the word "open").

Additionally or alternatively, while the example shown in FIGS. 8-9 show the first point positioned on head 32, other first points are considered to be within the spirit and scope of the present invention. In the example shown in FIG. 10, the first point comprises a knuckle of index finger 30, and line segment 160 intersects the fingertip and the knuckle.

Non-Tactile User Interface Calibration

In operation, non-tactile user interface 20 is typically used by more than one user, and each user may point differently at the same given interactive item 36 presented on display 28. In some embodiments, using elements of the non-tactile user interface (e.g., icons 30), computer 26 can calculate and store a calibration coefficient for each user of the non-tactile user interface.

Figure 11:
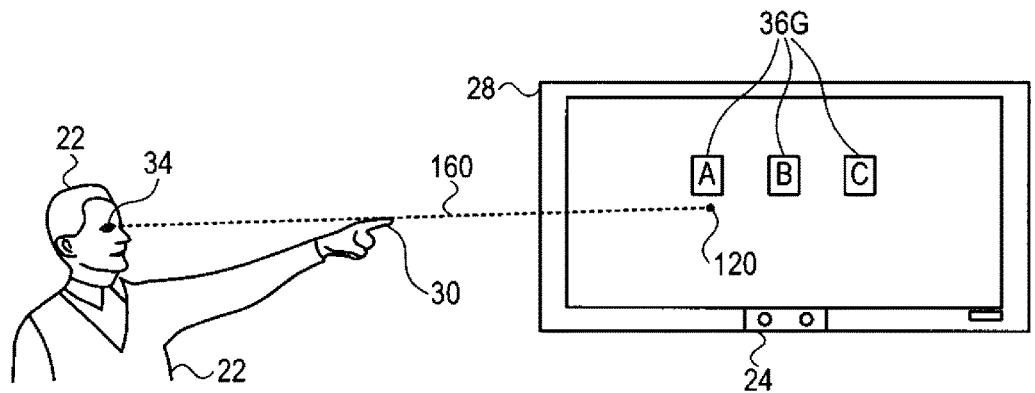
FIG. 11 is a schematic pictorial illustration of the user pointing a hand at a given icon presented on a display, in order to calibrate the computer system, in accordance with an embodiment of the present invention.

FIG. 11 is a schematic pictorial illustration of user 22 pointing finger 30 at a given icon 36G, in accordance with an embodiment of the present invention. As shown in the Figure, based on the user's positioning of finger 30, line segment 160 points just below the icon "A". Therefore, upon identifying user 22, computer 26 can apply an appropriate calibration coefficient when detecting gestures performed by the user.

For example, if non-tactile user interface 20 is inactive for a specified period of time, computer 26 may "lock" the non-tactile user interface, and present a single unlock icon 36G that user 22 can point to in order to unlock the user interface. As the user points at the unlock icon, computer 26 can identify target point 120 and calculate a calibration coefficient for the user (i.e., based on a proximity of the target point to the unlock icon).

Additionally or alternatively, there may be instances when user 22 performs a gesture, target point 120 is located between two or more icons 36G, and computer cannot identify which of the icons the user is pointing to. In instances when computer 26 cannot identify which icon 36G is being pointed to, the computer can identify a subset of the icons that are in proximity to target point 120, present the identified icons in a larger size, and prompt the user to point again.

Figure 12A:
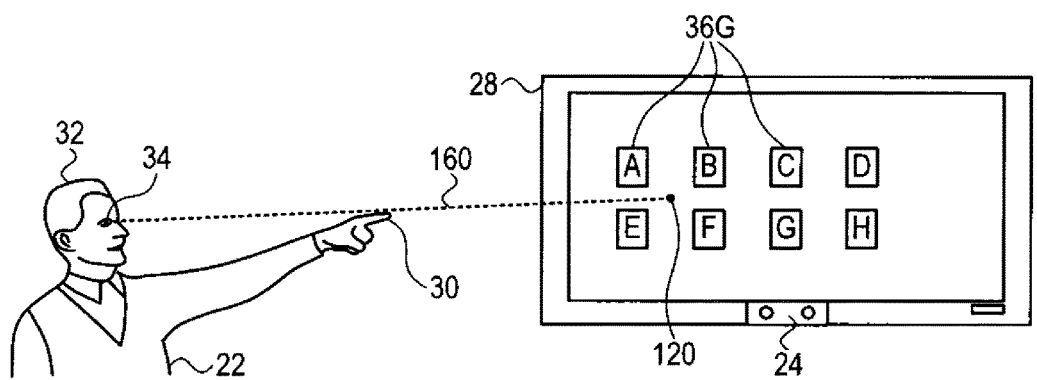
FIGS. 12A and 12B are schematic pictorial illustrations of the computer system assisting the user to select a given icon by presenting the icons in smaller and larger sizes, in accordance with an embodiment of the present invention.

FIG. 12A is a schematic pictorial illustration of user 22 positioning finger 30 to point at one of icons 36G, in accordance with an embodiment of the present invention. As shown in the figure, target point 120 is located between the icons "A", "B", "E", and "F".

Figure 12B:
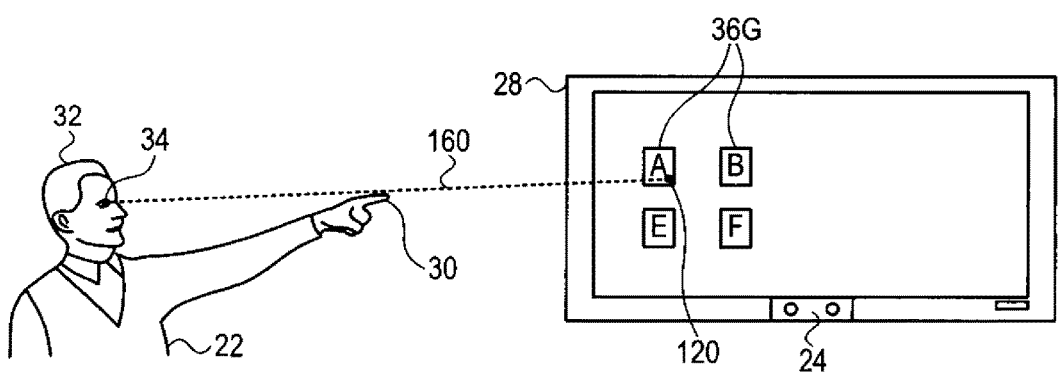

FIG. 12B is a schematic pictorial illustration of user 22 positioning finger 30 to point at a given icon 36G, where computer 26 presents the icons in a larger size, in accordance with an embodiment of the present invention. Continuing the example shown in FIG. 12A, computer 26 presents the icons "A", "B", "E", and "F" in a larger size, and user 22 positions finger 30 to point at the icon "A".

In a similar manner, user interface 20 can calibrate user 22, when the user selects a given icon 36G via gaze detection derived from a 2D image and/or a 3D map, as described supra. In a first, computer 26 may "lock" the non-tactile user interface, and present a single unlock icon 36G that user 22 can look at to in order to unlock the user interface. As the user gazes at the unlock icon, computer 26 can identify target point 120 and calculate a calibration coefficient for the user (i.e., based on a proximity of the target point to the unlock icon).

In a second example, if the user is gazing at a given interactive item 36G for a specific period of time, computer 26 may present context information for the given interactive item in an interactive item 36 (e.g., a pop-up dialog box). If the user gazes in proximity to the interactive item presenting the context information, computer 26 can calculate a calibration coefficient based on the proximity of the target point to the context information.

Middleware

As described supra, middleware for extracting higher-level information from the 3D maps and gaze information may run on processor 50 and/or CPU 68, and CPU 68 may execute application programs which drive user interface 72 based on information provided by the middleware, typically via an API.

The following are examples of middleware primitives that computer 26 can be use to extract information from 3D maps received from device 24:

InteractStart( ): Identifies a beginning of an interaction with user interface 20.

InteractHover(Pos2D, Radius): Identifies current target point 120 on display 28 (i.e., coordinates on the display where user 22 is pointing finger 30). The Pos2D parameter references a (two dimensional) location on display 28.

InteractPointNew(Pos2D, Radius): Identifies target point 120 when user 22 performs a Point-Select gesture.

InteractPointUpdate(Pos2D, Radius): Updates target point 120 as user 22 moves finger 30 along the X-Y plane while performing the Point-Touch gesture.

InteractEnd(Pos2D, Radius): Identifies when user 22 moves finger 30 outside field of view 94.

Using the middleware functions described supra, computer 26 can identify the following "stages" as user 22 performs the Point-Select and the Point-Touch gestures:

1. Finger Identification. During the Finger Identification stage, the middleware identifies and starts tracking finger 30. The middleware tracks the finger, and identifies any intent in the finger's motion toward the display. This enables a user interface 20 to differentiate a pointing gesture from other casual hand movements.
2. Gesture Identification. To reach the Gesture Identification stage, two conditions have typically been met: (a) User 22 moved finger 30 toward display 28, and (b) Target point 120 is within the boundaries of the display. In some configurations, target point 120 can be "located" slightly outside display 28. For example, since a valid Point-Touch gesture may include dragging a given interactive item 36 from "outside" display 28 (e.g., backspace, alt-tab etc.).

Upon entering the second stage, the middleware conveys an InteractStart( ) event. Upon conveying the InteractStart( ) event, the middleware is tracking finger 30 constantly and looking for a change in direction which defines the target point (see stage 3 below). While the finger is moving, the middleware is conveying InteractHover(Pos2D, Radius) events, which enables user interface 20 to detect where user 22 is currently pointing finger 30.

3. Interaction Point. When user 20 stops finger 30, or moves finger 30 away from display 28, the Interaction Point stage is reached. Based on a location of the second point, the middleware calculates target point 120 by connecting (for example) eyes 30 and the finger point to create line segment 160, and extends the line segment to reach the display. The middleware then conveys the event InteractPointNew(Pos2D, Radius) which identifies target point 120, thereby enabling user interface 20 to select the intended interactive item 36.
4. Interaction Ends. User 22 moving finger 30 away from display 28 and outside field of view 94 indicates completion of a gesture (e.g., the Point-Select and the Point-Touch gestures described supra), thereby disengaging the user from user interface 20. To re-engage user interface 20, user 22 can reposition finger 30 within field of view 94, thereby entering the finger identified stage described hereinabove.

At a higher level of abstraction, the middleware primitives described supra can be combined to define the following primitives that are similar to existing touch screen primitives that are known in the art:

Activate: The Point-Select gesture that engages (i.e., "clicking") a given interactive item 36. The Activate primitive can be used to activate an application, pressing button, or follow a hyperlink.

Pan: The Point-Touch gesture that moves a given interactive item 36 in any direction on the X-Y plane. In operation, some applications may be configured to react to movements on either the X-axis or the Y-axis.

Context: As described supra, the Point-Hold gesture comprising user 22 moving finger 30 toward a given interactive item 36, and the holding the finger relatively steady for a specific timer period (i.e., similar to positioning a mouse over an Item and pressing the right mouse button in a Microsoft Windows™ environment). In response to the Point-Hold gesture, computer 26 can convey feedback to the user indicating what to do next (e.g., dragging and/or drop a given icon 36G), or information on the given interactive item (e.g., movie plot summary as described supra).

In operation, the following events can be conveyed by the middleware in order to allow applications executing on computer 26 to be developed at a higher abstraction level which reflects user experience (UX) language primitives:

Start(Pos2D, Radius): Initiate interaction with user interface 20 in a manner similar to the InteractStart( ) event but at a higher level of abstraction.

Activate(Pos2D, Radius): Activate one of the gesture primitives described hereinbelow.

Pan(Pos2D, radius): User 22 initiates a Point-Touch gesture.

PanEnd(pos2D, Radius): User 22 completes (i.e., disengages from) a Point-Touch pan gesture (e.g., by moving finger 30 back away from the display).

Context(Point2D, Radius): User 22 initiates a Point-Hold gesture. In operation, user 22 may transition directly from the Point-Hold gesture to the Point-Touch gesture.

ContextEnd( ): User 22 disengages from user interface 20 upon completing the Point-Hold gesture (i.e., without transitioning to the Point-Touch gesture).

Interactive 3D Displays and Games

The combined 3D mapping and gaze direction information provided by sensing device 24 may be used in various ways to enhance the quality and user experience of 3D graphical rendering and 3D image presentation. For example, in an interactive game in which the user moves through a scene, scenery on display 28 may be brought into focus in the direction of the line of sight 92. Scenery in other areas (such as distant scenery when the user's point of view is on a nearby item, or vice versa) may be intentionally blurred, in order to simulate actual depth accommodation and/or to save bandwidth.

As another example, a game application running on computer 26 may be programmed to change a "story line" of the game depending on the user's gaze direction. For instance, the computer may surprise the user by presenting items (such as "enemy" characters) suddenly in areas of the display where the user is not looking at a given moment. The methods of gaze-directed pointing and selection that were described above in reference to FIGS. 6A-6C may likewise be applied in selecting interactive items 36 and "aiming" them (such as pointing a weapon at a target) in games and other "virtual worlds."

Depth and gaze information collected by device 24 can be used in enhancing the capabilities and user experience of 3D displays, particularly autostereoscopic displays. Such displays operate by presenting different images to the user's right and left eyes, but generally can be viewed only from a limited range of positions. By tracking the user's head location and gaze direction, device 24 may be able to direct the display to modify any images it presents so that they can be viewed over a larger range of positions and show different angular views of the items presented on the display. The parallax applied to near-field items 36 that are presented on the autostereoscopic display (or other 3D display) can be modified depending on the distance of the user's head from the display, in order to enhance realism and reduce visual discomfort that some users may feel in this environment.

This sort of 3D display can also be driven to interact with the user's 3D gestures. For example, based on a known location of the user, as well as the user's gaze direction, computer 26 can drive the 3D display to display virtual items in space at locations where the user can "touch" them. The user can then manipulate and interact with the virtual items by moving his hands (or other body parts) in the locations of the items in 3D space. Device 24 senses the user's gestures and provides appropriate input to computer 26, so that the computer can move or otherwise modify the items in response to the user interactions. This sort of interaction model also enables the user to reach for and interact with a given on-screen object that is located "behind" another object in the virtual space created by the display.

In an additional example, computer 26 may present content comprising multiple interactive items 36 (e.g., characters in a game) on display 28. In some embodiments, computer 26 can identify a region (i.e., an area around target point 12) on the display in the direction of the user's gaze, and present the content within the identified region as "in focus" (i.e., present clearly), and the content outside the identified region as "out of focus" (i.e. present blurred). In an alternative embodiment, each of the multiple interactive items may have an associated depth value, and as the user gazes toward a given interactive item, the computer can simulate a 3D environment by presenting the interactive items whose associated depth values are in accordance with the depth value if the given interactive item as "in focus" (i.e., present clearly), and presenting the interactive items whose associated depth values are not in accordance with the depth value if the given interactive item as "out of focus" (i.e. present blurred).

In a further example, while playing a game, user 22 can select a weapon by pointing at a weapon presented as an interactive icon on the display. If the selected weapon is a gun, the user can "aim" the gun using the Point-Touch gesture, and "shoot" the gun using the Point-Select gesture or the Trigger gestures described supra. Alternatively, if the selected weapon is a sword, then the user can manipulate the sword in three dimensions (i.e., along the X-Y plane and the Z-axis) by using a combination of the Point-Select and the Point-Touch gestures.

The above applications are just a few examples of how mixed modality user interfaces can be used to enhance system capabilities and user experience, and other, similar applications are considered to be within the scope of the present invention. As another example, the capabilities of sensing device 24 may be used in gauging user interest in content such as a Web site or video program, depending on the on-screen object on which the user fixed his gaze, as well as whether the user was looking at the display at all while a certain program (such as a commercial) was presented. These capabilities may similarly be used in extracting user interest profiles, as described, for example, in U.S. patent application Ser. No. 13/295,106, filed Nov. 14, 2011, which is incorporated herein by reference.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. An apparatus, comprising:
a sensing device configured to receive a sequence of three dimensional (3D) maps of at least a part of a body of a user, including a head of the user, and to receive a two dimensional (2D) image of the user, the 2D image including an eye of the user; and
a computer coupled to the sensing device and configured to extract, from the 3D maps, 3D coordinates of the head of the user and to identify, based on the 3D coordinates of the head and the image of the eye, a direction of a gaze performed by the user, to identify an interactive item presented in the direction of the gaze on a display coupled to the computer, to extract from the 3D maps an indication that the user is moving a limb of the body in a specific direction, and to move the identified interactive item on the display responsively to the indication.

2. The apparatus according to claim 1, wherein the computer is configured to change a state of the interactive item.

3. The apparatus according to claim 2, wherein the computer is configured to change the state of the interactive item is changed responsively to the gaze.

4. The apparatus according to claim 2, wherein the computer is configured to change the state of the interactive item responsively to a vocal command received from the user.

5. The apparatus according to claim 2, wherein the computer is configured to change the state by directing input received from the user to the interactive item.

6. A method, comprising:
receiving a sequence of three-dimensional (3D) maps of at least a part of a body of a user of a computerized system;
extracting, from the 3D maps, 3D coordinates of a head of the user;
receiving a two dimensional (2D) image of the user, the image including an eye of the user;
identifying, based on the 3D coordinates of the head and the image of the eye, a direction of a gaze performed by the user;
identifying an interactive item presented in the direction of the gaze on a display coupled to the computerized system;
extracting from the 3D maps an indication that the user is moving a limb of the body in a specific direction; and
moving the identified interactive item on the display responsively to the indication.

7. The method according to claim 6, and comprising changing a state of the interactive item.

8. The method according to claim 7, wherein the state of the interactive item is changed responsively to the gaze.

9. The method according to claim 7, wherein the state of the interactive item is changed responsively to a vocal command received from the user.

10. The method according to claim 7, wherein changing the state comprises directing input received from the user to the interactive item.

11. The method according to claim 7, and comprising identifying a target point on the display in the direction of the gaze, and calculating a calibration coefficient based on the proximity of the target point to the interactive item.

12. The method according to claim 1, wherein extracting the indication comprises detecting a swiping motion of a hand, and wherein repositioning the identified interactive item comprises moving the identified interactive item on the display in the direction of the swiping motion.

13. The method according to claim 6, wherein extracting the indication comprises detecting a pointing motion of a finger, and wherein repositioning the identified interactive item comprises moving the identified interactive item on the display in the direction pointed to by the finger.

14. A computer software product comprising a non-transitory computer-readable medium, in which program instructions are stored, which instructions, when read by a computer, cause the computer to receive a sequence of three-dimensional (3D) maps of at least a part of a body of a user of the computer, including a head of the user, and to receive a two dimensional (2D) image of the user, the 2D image including an eye of the user, to extract, from the 3D maps, 3D coordinates of the head of the user, to identify, based on the 3D coordinates of the head and the image of the eye, a direction of a gaze performed by the user, to identify an interactive item presented in the direction of the gaze on a display coupled to the computer, to extract from the 3D maps an indication that the user is moving a limb of the body in a specific direction, and to move the identified interactive item on the display responsively to the indication.

* * * * *